United States Patent
Khazeni et al.

(10) Patent No.: US 10,540,035 B2
(45) Date of Patent: Jan. 21, 2020

(54) NORMALIZING CAPACITIVE SENSING MEASUREMENTS TO REDUCE EFFECTS OF LOW GROUND MASS AND NOISE

(71) Applicant: SYNAPTICS INCORPORATED, San Jose, CA (US)

(72) Inventors: Kasra Khazeni, San Jose, CA (US); Joseph Kurth Reynolds, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/199,428

(22) Filed: Jun. 30, 2016

(65) Prior Publication Data

US 2018/0004338 A1   Jan. 4, 2018

(51) Int. Cl.
*G06F 3/041* (2006.01)
*G06F 3/044* (2006.01)

(52) U.S. Cl.
CPC .......... *G06F 3/0416* (2013.01); *G06F 3/041* (2013.01); *G06F 3/044* (2013.01)

(58) Field of Classification Search
CPC ......... G06F 3/0416; G06F 3/044; G06F 3/041
See application file for complete search history.

(56) References Cited

U.S. PATENT DOCUMENTS

| | | | |
|---|---|---|---|
| 6,177,918 B1 | 1/2001 | Colgan et al. | |
| 6,310,611 B1 | 10/2001 | Caldwell | |
| 7,315,300 B2 | 1/2008 | Hill et al. | |
| 8,121,806 B2 | 2/2012 | Mahowald et al. | |
| 8,269,511 B2 | 9/2012 | Jordan | |
| 8,411,066 B2 | 4/2013 | Cordeiro et al. | |
| 8,456,443 B2 | 6/2013 | Bulea et al. | |
| 8,471,570 B2 | 6/2013 | Portmann | |
| 8,508,503 B2 | 8/2013 | Lin et al. | |
| 8,536,880 B2 | 9/2013 | Philipp | |
| 8,648,835 B2 | 2/2014 | Rapakko | |
| 8,736,573 B2 | 5/2014 | Byun et al. | |
| 8,902,192 B2 | 12/2014 | Miyamoto et al. | |
| 8,970,537 B1 | 3/2015 | Shepelev et al. | |
| 9,081,435 B2 | 7/2015 | Kim et al. | |
| 9,098,139 B2 | 8/2015 | Jordan | |
| 9,274,662 B2 | 3/2016 | Schwartz et al. | |
| 9,280,240 B2 | 3/2016 | Hoch et al. | |
| 2008/0158169 A1 | 7/2008 | O'Connor et al. | |
| 2009/0174675 A1 | 7/2009 | Gillespie et al. | |

(Continued)

*Primary Examiner* — Yaron Cohen
(74) *Attorney, Agent, or Firm* — Patterson + Sheridan, LLP (57) ABSTRACT

An input device can be capacitive coupled to earth ground and noise sources which can interfere with the ability of the input device to detect an input object. To mitigate the effects from these capacitive couplings, the input device drives a modulated capacitive sensing signal onto a plurality of sensor electrodes in parallel. The sensor electrodes are coupled to respective analog front ends (AFEs) which generate an output signal for each of the sensor electrodes. The input device combines the output signals for the sensor electrodes to generate a normalization value. For example, the output signals may be digital values which are summed by the input device to generate the normalization value. The input device then divides each of the output signals by the normalization value to result in a normalized signal corresponding to each of the sensor electrodes.

20 Claims, 6 Drawing Sheets

(56) References Cited

U.S. PATENT DOCUMENTS

| | | |
|---|---|---|
| 2010/0044122 A1 | 2/2010 | Sleeman et al. |
| 2010/0060608 A1 | 3/2010 | Yousefpor |
| 2010/0079401 A1 | 4/2010 | Staton |
| 2011/0242045 A1 | 10/2011 | Park et al. |
| 2012/0139846 A1 | 7/2012 | Krah et al. |
| 2012/0182252 A1 | 7/2012 | Brosnan et al. |
| 2012/0249476 A1 | 10/2012 | Schwartz et al. |
| 2013/0173211 A1 | 7/2013 | Hoch et al. |
| 2013/0176233 A1 | 7/2013 | Lin et al. |
| 2013/0265242 A1 | 10/2013 | Richards et al. |
| 2014/0062952 A1 | 3/2014 | Savitsky et al. |
| 2014/0184551 A1* | 7/2014 | Igarashi ............... G06F 3/041 345/173 |
| 2015/0002445 A1 | 1/2015 | Brunet et al. |
| 2015/0091850 A1* | 4/2015 | Morein ............... G06F 3/0412 345/174 |
| 2015/0097802 A1 | 4/2015 | Kim et al. |
| 2015/0138145 A1 | 5/2015 | Hwang et al. |
| 2015/0145802 A1 | 5/2015 | Yao et al. |
| 2015/0153870 A1 | 6/2015 | Lee et al. |
| 2015/0177980 A1* | 6/2015 | Yanase ............... G06F 3/04883 345/174 |
| 2017/0060288 A1* | 3/2017 | Subramanian ......... G06F 3/044 |

\* cited by examiner

NORMALIZING CAPACITIVE SENSING MEASUREMENTS TO REDUCE EFFECTS OF LOW GROUND MASS AND NOISE

FIELD OF THE INVENTION

This invention generally relates to electronic devices and normalizing output signals during capacitive sensing.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE INVENTION

One embodiment described herein is an input device that includes a plurality of sensor electrodes in a sensing region of the input device and a processing system coupled to the plurality of sensor electrodes. The processing system is configured to drive a first plurality of capacitive sensing signals in parallel onto a first group of the plurality of sensor electrodes, generate a first plurality of output signals corresponding to the first group of the plurality of sensor electrodes in response to driving the first plurality of capacitive sensing signals, normalize a first output signal corresponding to one of the plurality of sensor electrodes in the first group using a combination of the first plurality of output signals, and determine a location of an input object based on the normalized first output signal.

Another embodiment described herein is a processing system that includes a sensor module configured to drive a first plurality of capacitive sensing signals in parallel onto a first group of a plurality of sensor electrodes and a determination module configured to generate a first plurality of output signals corresponding to the first group of the plurality of sensor electrodes in response to driving the first plurality of capacitive sensing signals, normalize a first output signal corresponding to one of the plurality of sensor electrodes in the first group using a combination of the first plurality of output signals, and determine a location of an input object based on the normalized first output signal.

Another embodiment presented here in a method that includes driving a first plurality of capacitive sensing signals in parallel onto a first group of a plurality of sensor electrodes, where the plurality of sensor electrodes are in a sensing region of an input device. The method includes generating a first plurality of output signals corresponding to the first group of the plurality of sensor electrodes in response to driving the first plurality of capacitive sensing signals, normalizing a first output signal corresponding to one of the plurality of sensor electrodes in the first group using a combination of the first plurality of output signals, and determining a location of an input object based on the normalized first output signal.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present invention provide input devices and methods that facilitate improved usability. An input device can be capacitively coupled to earth ground which can interfere with the ability of the input device to detect an input object. Typically, the input device is unable to control these coupling capacitances which vary as the environment of the input device varies. Situations where a capacitance to earth ground has a significant effect on the capacitive signals measured by the input device are referred to herein as low ground mass (LGM) conditions. For example, the LGM may be so large that the input device fails to detect the relatively smaller capacitive change due to a touch or hover event corresponding to an input device. Furthermore, noise sources such as power supply noise or charger noise can affect output signals measured by the input device which prevent the device for detecting a touch or hover event.

The embodiments herein describe an input device with a processing system that uses normalization to mitigate or remove the effects of the LGM or noise sources from capacitive measurements (also referred to as delta signals or changes in capacitance) signals generated during capacitive sensing. To do so, the processing system drives a modulated capacitive sensing signal onto a plurality of sensor electrodes in parallel. The sensor electrodes are coupled to respective analog front ends (AFEs) which generate a respective output signal corresponding to each of the sensor electrodes. Using baseline measurements, the processing system determines a capacitive measurement (e.g., a delta signal) for each of the sensor electrodes. The processing system combines the capacitive measurements for the sensor electrodes to generate a normalization value. For example, the capacitive measurements may be digital values which are summed by the processing system to determine the normalization value. The processing system then divides each of the capacitive measurements by the normalization value to result in a normalized capacitive measurement corresponding to each of the sensor electrodes. Because the LGM and the noise source generally affects the sensor electrodes equally, dividing the individual capacitive measurements by the sum of all the capacitive measurements (i.e., the normalization value), the LGM and noise is removed from the normalized measurements.

Figure 1:
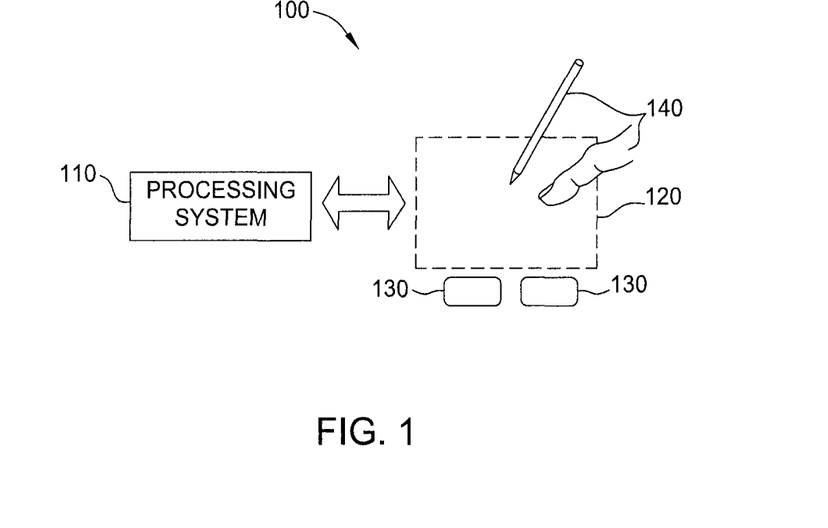
FIG. 1 is a block diagram of an exemplary system that includes an input device in accordance with an embodiment described herein.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
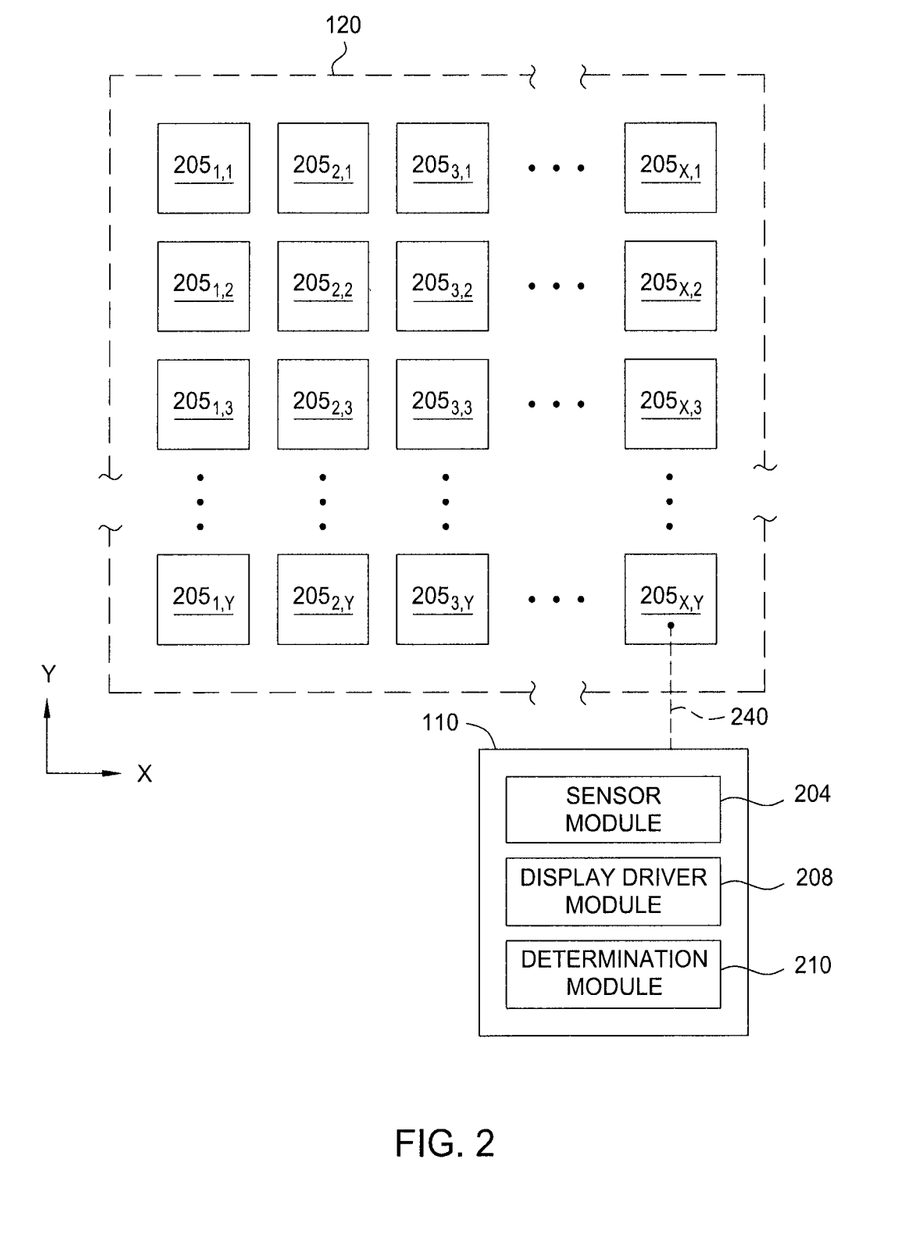
FIG. 2 illustrates portions of exemplary patterns of capacitive sensing pixels in accordance with an embodiment described herein.

FIG. 2 shows a portion of an exemplary pattern of capacitive sensing pixels 205 (also referred to herein as capacitive pixels or sensing pixels) configured to sense in the sensing region 120 associated with a pattern, according to some embodiments. Each capacitive pixel 205 may include one of more of the sensor electrodes described above. For clarity of illustration and description, FIG. 2 presents the regions of the capacitive pixels 205 in a pattern of simple rectangles and does not show various other components within the capacitive pixels 205. In one embodiment, the capacitive sensing pixels 205 are areas of localized capacitance (capacitive coupling). Capacitive pixels 205 may be formed between an individual sensor electrode and ground in a first mode of operation and between groups of sensor electrodes used as transmitter and receiver electrodes in a second mode of operation. The capacitive coupling changes with the proximity and motion of input objects in the sensing region 120 associated with the capacitive pixels 205, and thus may be used as an indicator of the presence of the input object in the sensing region 120 of the input device.

The exemplary pattern (e.g., a matrix forming a rectangular array) comprises an array of capacitive sensing pixels $205_{X,Y}$ (referred collectively as pixels 205) arranged in X columns and Y rows in a common plane, wherein X and Y are positive integers, although one of X and Y may be zero. It is contemplated that the pattern of sensing pixels 205 may comprise a plurality of sensing pixels 205 having other configurations, such as polar arrays, repeating patterns, non-repeating patterns, non-uniform arrays a single row or column, or other suitable arrangement. Further, as will be discussed in more detail below, the sensor electrodes in the sensing pixels 205 may be any shape such as circular, rectangular, diamond, star, square, noncovex, convex, nonconcave concave, etc. As shown here, the sensing pixels 205 are coupled to the processing system 110.

In a first mode of operation, at least one sensor electrode within the capacitive sensing pixels 205 may be utilized to detect the presence of an input object via absolute sensing techniques. A sensor module 204 (e.g., a sensor circuit) in processing system 110 is configured to drive a sensor electrode using a trace 240 in each pixel 205 with a capacitive sensing signal (which can be modulated or unmodulated) and measure a capacitance between the sensor electrode and the input object (e.g., free space or earth ground) based on the capacitive sensing signal, which is utilized by the processing system 110 or other processor to determine the position of the input object or features in a finger. In other words, according to some embodiments, the sensor module 204 is configured to drive the sensor electrode with the capacitive sensing signal and detect an input object based on changes in a measured resulting capacitive sensing signal, which may be affected by the presence of the input object.

The various electrodes of capacitive pixels 205 are typically ohmically isolated from the electrodes of other capacitive pixels 205. Additionally, where a pixel 205 includes multiple electrodes, the electrodes may be ohmically isolated from each other. That is, one or more insulators separate the sensor electrodes and prevent them from electrically shorting to each other.

In a second mode of operation, sensor electrodes in the capacitive pixels 205 are utilized to detect the presence of an input object via transcapacitance sensing techniques. That is, processing system 110 may drive at least one sensor electrode in a pixel 205 with a transmitter signal and receive resulting signals using one or more of the other sensor electrodes in another pixel 205, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

In some embodiments, the capacitive pixels 205 are "scanned" to determine these capacitive couplings. That is, in one embodiment, one or more of the sensor electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes configured as receiver sensor electrodes may be operated singly or multiply to acquire resulting signals. The resulting signals may be used to determine measurements of the capacitive couplings at the capacitive pixels 205.

In other embodiments, "scanning" pixels 205 to determine these capacitive coupling includes driving with a modulated signal and measuring the absolute capacitance of one or more of the sensor electrodes. In another embodiment, the sensor electrodes may be operated such that the modulated signal is driven on a sensor electrode in multiple capacitive pixels 205 at the same time. In such embodiments, an absolute capacitive measurement may be obtained from each of the one or more pixels 205 simultaneously. In one embodiment, the input device 100 simultaneously drives a sensor electrode in a plurality of capacitive pixels 205 and measures an absolute capacitive measurement for each of the pixels 205 in the same sensing cycle. In various embodiments, processing system 110 may be configured to selectively drive and receive with a portion of sensor electrodes. For example, the sensor electrodes may be selected based on, but not limited to, an application running on the host processor, a status of the input device, an operating mode of the sensing device and a determined location of an input object. In another embodiment, the input object (e.g., a finger) is the transmitter that is driven with the modulated signal while the sensor electrode is a receiver.

A set of measurements from the capacitive pixels 205 form a capacitive image (also capacitive frame) representative of the capacitive couplings at the pixels 205 as discussed above. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more of the sensor electrodes in the capacitive pixels 205 include one or more display electrodes used in updating the display of the display screen. In one or more embodiments, the display electrodes comprise one or more segments of a Vcom electrode (common electrodes), a source drive line, gate line, an anode electrode or cathode electrode, or any other display element. These display electrodes may be disposed on an appropriate display screen substrate. For example, the electrodes may be disposed on the a transparent substrate (a glass substrate, TFT glass, a plastic substrate or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, an electrode that is used as both a sensor and a display electrode can also be referred to as a combination electrode, since it performs multiple functions.

Continuing to refer to FIG. 2, the processing system 110 coupled to the sensor electrodes includes a sensor module 204 and optionally, a display driver module 208. In one embodiment the sensor module comprises circuitry configured to drive a transmitter signal onto and receive resulting signals with the resulting signals the sensor electrodes during periods in which input sensing is desired. In one embodiment the sensor module 204 includes a transmitter module including circuitry configured to drive a transmitter signal onto the sensor electrodes during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region. The modulated signal used in absolute capacitive sensing may be the same or different from the transmitter signal used in transcapacitance sensing. The sensor module 204 may be selectively coupled to one or more of the sensor electrodes in the capacitive pixels 205. For example, the sensor module 204 may be coupled to selected portions of the sensor electrodes and operate in either an absolute or transcapacitance sensing mode. In another example, the sensor module 204 may be coupled to different sensor electrodes when operating in the absolute sensing mode than when operating in the transcapacitance sensing mode.

In various embodiments the sensor module 204 may comprise a receiver module that includes circuitry configured to receive a resulting signal with the sensor electrodes comprising effects corresponding to the transmitter signal during periods in which input sensing is desired. In one or more embodiments, the receiver module is configured to drive a modulated signal onto a first sensor electrode in one of the pixels 205 and receive a resulting signal corresponding to the modulated signal to determine changes in absolute capacitance of the sensor electrode. The receiver module may determine a position of the input object in the sensing region 120 or may provide a signal including information indicative of the resulting signal to another module or processor, for example, a determination module 210 or a processor of the electronic device (i.e., a host processor), for determining the position of the input object in the sensing region 120. In one or more embodiments, the receiver module comprises a plurality of receivers, where each receiver may be an analog front ends (AFEs).

In one or more embodiments, capacitive sensing (or input sensing) and display updating may occur during at least partially overlapping periods. For example, as a combination electrode is driven for display updating, the combination electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes for capacitive sensing during any one or more of or any combination of the different non-display update times.

The display driver module 208 includes circuitry confirmed to provide display image update information to the display of the display device during non-sensing (e.g., display updating) periods. The display driver module 208 may be included with or separate from the sensor module 204. In one embodiment, the processing system comprises a first integrated controller comprising the display driver module 208 and at least a portion of the sensor module 204 (i.e., transmitter module and/or receiver module). In another embodiment, the processing system comprises a first integrated controller comprising the display driver module 208 and a second integrated controller comprising the sensor module 204. In yet another embodiment, the processing system comprises a first integrated controller comprising a display driver module 208 and one of a transmitter module or a receiver module and a second integrated controller comprising the other one of the transmitter module and receiver module.

Figure 3:
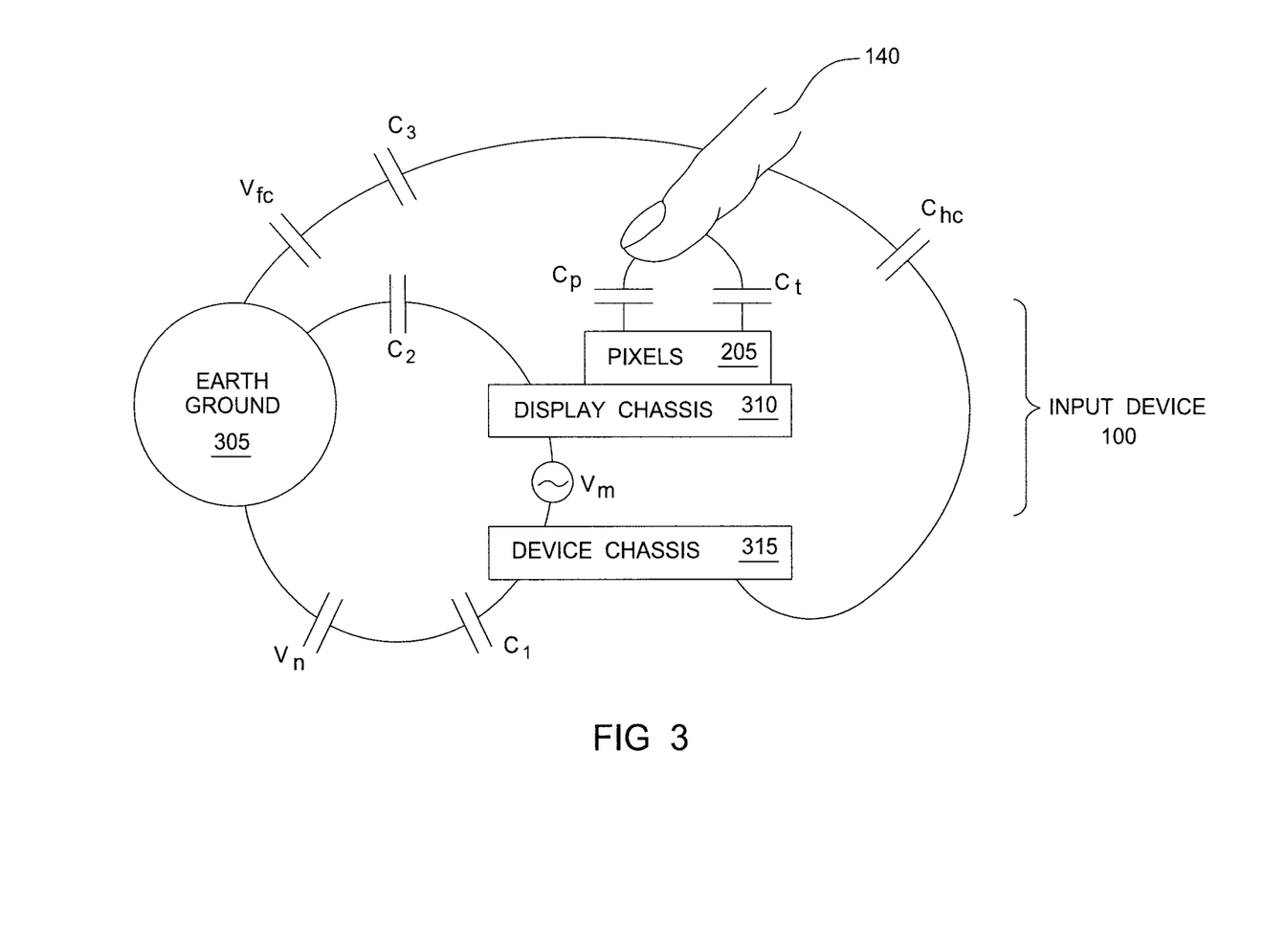
FIG. 3 illustrates the effect of low ground mass on a capacitive sensing input device in accordance with an embodiment described herein.

FIG. 3 illustrates the effect of LGM on a capacitive sensing input device in accordance with an embodiment described herein. Specifically, FIG. 3 illustrates various capacitances between earth ground 305, the input object 140, and the input device 100. As shown, the input device 100 includes a device chassis 315 and a display chassis 310 which supports the capacitive sensing pixels 205. The device chassis 315 which may include the casing of the input device 100 and the internal computing elements of the device 100 such as a computer processor, some or all of the processing system 110 described above, input/output interfaces, antennas, and wireless transmitters and receivers. The device chassis 315 is coupled to the input object 140 via a capacitance $C_{hc}$ and to earth ground 305 via capacitance $C_1$. The values of the capacitances $C_{hc}$ and $C_1$ vary depending on the relationship of the components in FIG. 3. For example, if the input device 100 is being held by the hand of the user (i.e., the input object 140), the capacitance $C_{hc}$ may be much larger than $C_1$. However, if the input device 100 is laid on a table, the capacitance $C_1$ may be larger than $C_{hc}$.

The display chassis 310 is also capacitively coupled to ground 305 via capacitance $C_2$ and the input object 140 is capacitively coupled to ground 305 via capacitance $C_3$. In one embodiment, the combination of the capacitances $C_1$, $C_2$, and $C_3$ determine the LGM of the system which vary as the environment of the input device 100 varies. The input device 100 may not have any mechanism to measure the position of the input device 100 in the environment, and thus, may be unable to accurately determine if the capacitances in the LGM negatively affect the ability of the input device 100 to measure the capacitance $C_t$—i.e., the capacitive coupling between the input object 140 and one of the capacitive sensing pixels 205.

Moreover, FIG. 3 includes voltage sources $V_{fc}$, $V_n$, and $V_m$ which can introduce noise that affects the output signals generated in response to the capacitive sensing signals. The noise source $V_{fc}$ represents finger coupled noise that is introduced into the capacitive pixels 205 via the input object 140. For example, any number of different periodic signals can be transmitted from the human body to the capacitive sensing pixels 205 which are then measured by the input device 100. The noise source $V_n$ represents noise that can originate from a charger that is between the device chassis 315 and ground 305. That is, when plugged into a charger or some kind of power adapter, different periodic signals can be coupled into the device chassis 315 which can affect the signals measured using the capacitive sensing pixels 205.

The voltage source $V_m$ is a modulated signal (i.e., the capacitive sensing signal) which is generated by a power supply (not shown) in the device chassis 315 and is used by the display chassis 310 to modulate the capacitive sensing pixels 205. As described in greater detail below, the modulated signal represented by $V_m$ permits the input device to measure the capacitive coupling between the pixels 205 and the input object 140. However, in addition to providing the capacitive sensing signal, the power supply may also introduce unwanted noise in the source $V_m$ which can affect the signals measured using the pixels 205.

To mitigate or remove the effects of LGM and the noise sources described above, the input device 100 normalizes delta signals (or capacitive measurements) derived from the output signals and from driving the capacitive sensing signal (e.g., $V_m$) onto sensor electrodes in the capacitive sensing pixels 205. As described in greater detail below, the input device 100 simultaneously modulates the sensor electrodes in multiple pixels 205 using the capacitive sensing signal. Because the LGM and noise sources generally affect the pixels 205 the same, the sum of the delta signals derived from output signals and modulating the sensor electrodes can be used as a normalization value to mitigate or remove the LGM and noise sources from the individual delta signals.

Figure 4:
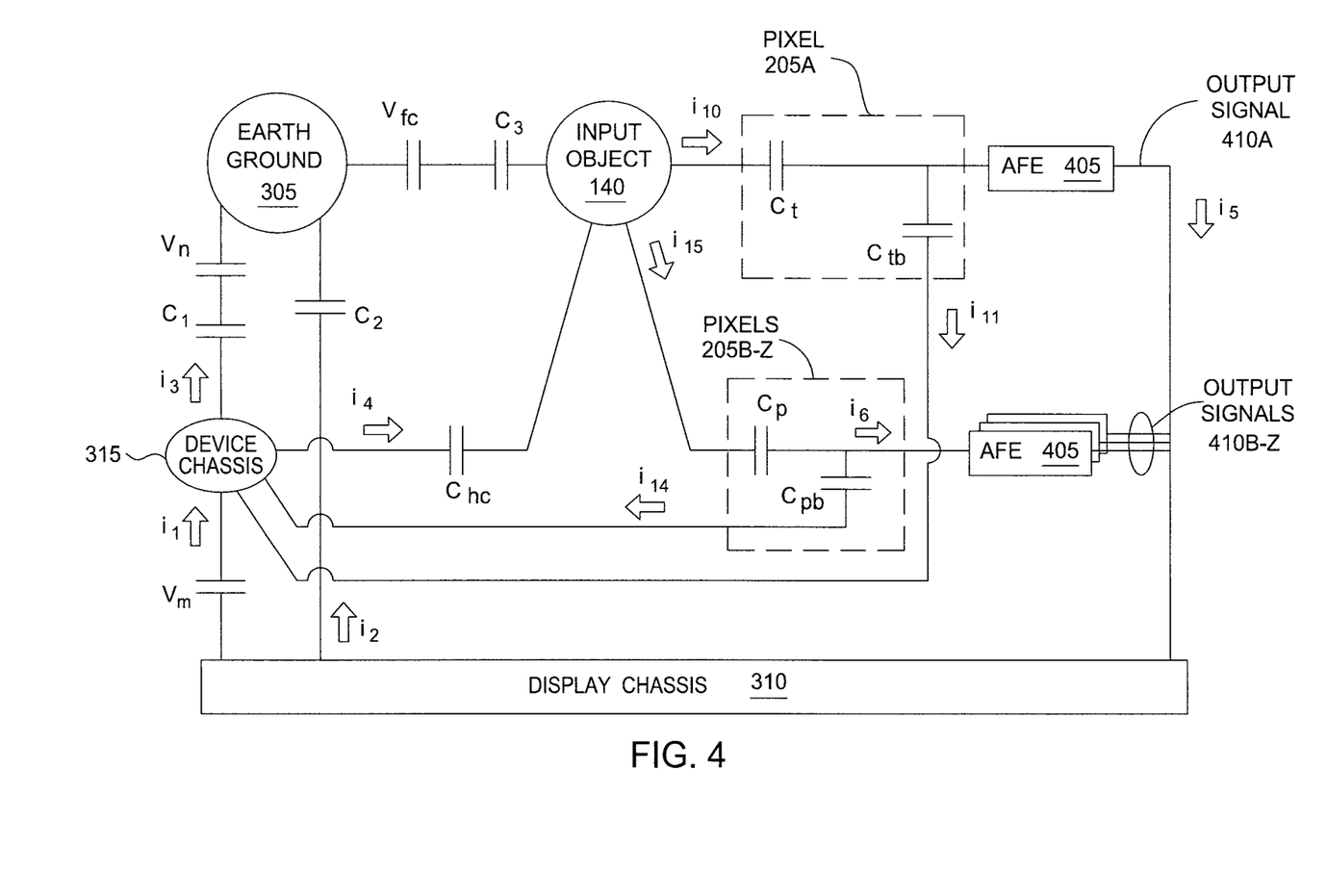
FIG. 4 illustrates the effect of low ground mass on a capacitive sensing input device in accordance with an embodiment described herein.

FIG. 4 illustrates the effect of LGM on a capacitive sensing input device 100 in accordance with an embodiment described herein. FIG. 4 illustrates the same components and coupling capacitances shown in FIG. 3 but with added currents and circuit components. Specifically, FIG. 4 illustrates various currents resulting from modulating the pixels 205 using the capacitive sensing signals. In addition, FIG. 4 shows the capacitances corresponding to one of the capacitive sensing pixels—i.e., pixel 205A. The capacitance $C_t$ in pixel 205A is the capacitance the input device 100 is attempting to measure. In this absolute capacitance embodiment, the input device 100 attempts to measure changes in the capacitance $C_t$ which can be used to detect the presence of the input object 140. The capacitance $C_{tb}$ in the pixel 205A represents the capacitive coupling between the pixel 205A and the device chassis 315.

The remaining capacitive sensing pixels—i.e., pixels 205B-Z—are shown using combined capacitances where the capacitance $C_p$ represents the total capacitance between the pixels 205B-Z and the input object 140 and the capacitance $C_{pb}$ represents the total capacitance between the pixels 250B-Z and the device chassis 315. The capacitive sensing pixels 205 are coupled to respective AFEs 405. In one example, a sensor electrode in each of the pixels 205 is coupled to a respective one of the AFEs 405. Generally, the AFEs 405 include circuitry such as integrators, switches, and analog to digital converters (ADC) for generating output signals (e.g., digital signals) in response to driving the capacitive sensing signals on the sensor electrodes in the pixels 205. In one embodiment, the processing system derives delta signals by comparing the output currents 410 to baseline measurements thereby identifying a change in capacitance or charge. Although the embodiments herein describe using absolute capacitance sensing to determine a change in capacitance between the pixels 205 and the input object 140, in another embodiment, the delta signals may be derived from resulting signals from driving a transmitter signal on a transmitter electrode used when performing transcapacitive sensing.

In one embodiment, the input device may include the same number of AFEs 405 as capacitive sensing pixels 205. However, in another embodiment, the input device may include fewer numbers of AFEs 405 than the pixels 205. In this example, the sensor electrodes in multiple capacitive sensing pixels 205 may be selectively coupled to the same AFE 405.

The output current 410A corresponding to pixel 205A and the output currents 410 B-Z corresponding to pixels 205B-Z are transmitted to the display chassis 310. Using hardware or firmware, a determination module in the processing system 110 (not shown) can normalize delta signals derived from the output currents 410A-Z to mitigate the effects of the LGM and the noise sources on the output currents 410A-Z.

Figure 5:
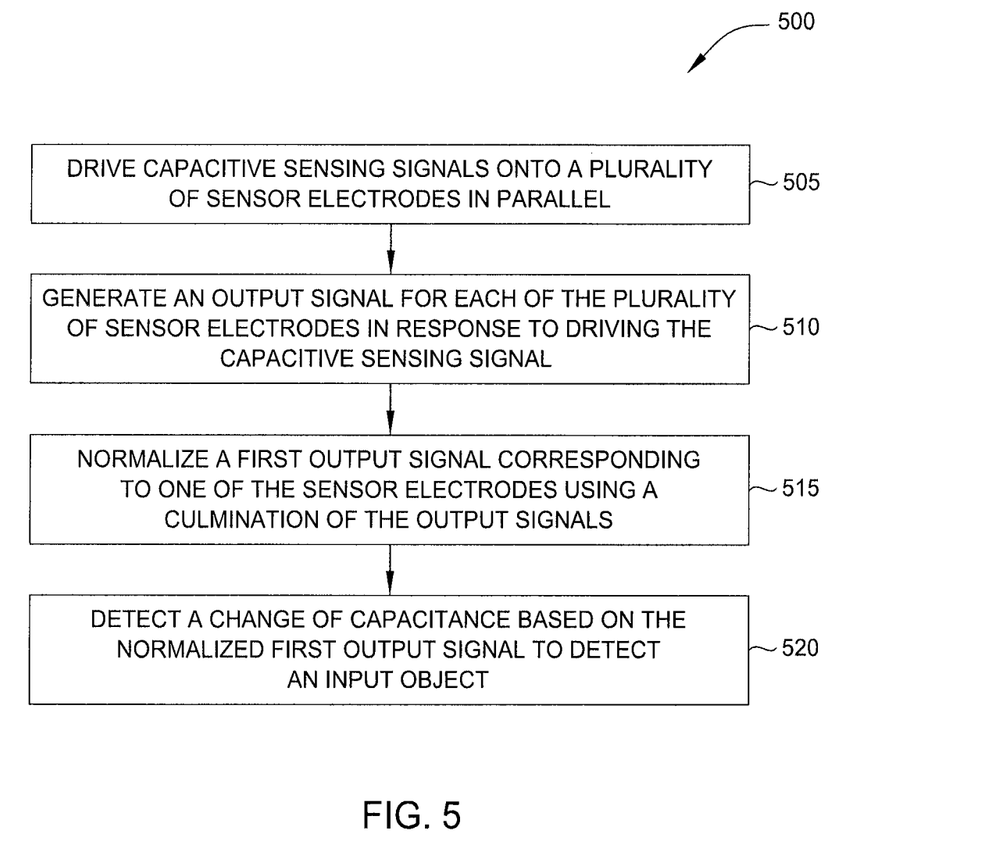
FIG. 5 illustrates a flowchart for normalizing capacitive sensing measurements in accordance with an embodiment described herein.

FIG. 5 illustrates a flowchart of a method 500 for normalizing capacitive measurements in accordance with an embodiment described herein. At block 505, the sensor module in the processing system drives capacitive sensing signals onto a plurality of sensor electrodes in parallel. In one embodiment, the sensor module drives the capacitive sensing signals onto sensor electrodes in each of the capacitive sensing pixels 205A-Z shown in FIG. 4. The capacitive sensing signal can be any modulated signal—e.g., a square wave, sinusoid, saw tooth, and the like.

At block 510, the AFEs coupled to the sensor electrodes generate output signals for each of the plurality of sensor electrodes in response to driving the capacitive sensing signals. Because the capacitive sensing signals are driven in parallel to the sensor electrodes, the output signals for the sensor electrodes are affected in generally the same manner by the LGM and any noise. For example, referring to FIG. 4, the values of the capacitances $C_1$, $C_2$, and $C_3$ (which set the current conditions of the LGM) affect the output currents 410 for all the pixels 205 in the same manner. Similarly, if a charger ($V_n$), power supply ($V_m$), or finger coupled noise source ($V_{fc}$) causes noise when driving the capacitive sensing signals at block 505, this noise appears in all the generated output currents 410. The effect of the LGM, the noise sources, and the input object 140 on the output signal 405A is represented by Equation 1:

$$i_5 = \left[ \frac{[C_1 C_3 + (C_1 + C_2 + C_3)C_{hc}]V'_{mod} + (C_1 + C_2)C_3 V'_{fc} + C_1 C_3 V'_n}{(C_1 + C_2)C_3 + (C_1 + C_2 + C_3)(C_{hc} + C_p + C_t)} \right] C_t + C_{tb} V'_{mod} \quad (1)$$

The effect of the LGM, the noise sources, and the input object 140 on the output signals 405B-Z corresponding to pixel 205B-Z is shown by Equation 2:

$$i_6 = \left[ \frac{[C_1 C_3 + (C_1 + C_2 + C_3)C_{hc}]V'_{mod} + (C_1 + C_2)C_3 V'_{fc} + C_1 C_3 V'_n}{(C_1 + C_2)C_3 + (C_1 + C_2 + C_3)(C_{hc} + C_p + C_t)} \right] C_p + C_{pb} V'_{mod} \quad (2)$$

In Equations 1 and 2, $V'_m$ and $V'_n$ are the time derivatives of the corresponding quantities. As shown, the output signals depend on the integral of the two currents $i_5$ and $i_6$ with respect to time which leaves the equations intact except the time derivative of the voltages reduces $V'_m$ and $V'_n$ to their amplitudes (and potentially a constant added to the equations from the integral, which is usually the reference voltage of the integrators in the AFEs).

At block 515, the processing system identifies a change in capacitance (a capacitive measurement or delta signal) for each of the output signals using baseline measurements (e.g., baseline currents). The baseline currents are shown in Equations 3 and 4 where the finger (i.e., input object 140) and the rest of the human body has a negligible coupling to all the pixels 205 and the values of $C_t$ and $C_p$ are zero.

$$i_{5b} = i_5(C_t \approx 0) = C_{tb} V'_m \quad (3)$$

$$i_{6b} = i_6(C_p \approx 0) = C_{pb} V'_m \quad (4)$$

In order to detect the presence of a touch (or hover) event of the input object 140, the baseline currents $i_{5b}$ and $i_{6b}$ (which can be captured during a previous capacitive sensing period when the input object is not proximate to the sensing region) are subtracted from the currents $i_5$ and $i_6$ (or equivalently, their integral—i.e., charge) to yield the change in capacitance relative to the baseline currents. The results of these subtractions are shown in Equations 5 and 6.

$$\Delta i_5 = i_5 - i_{5b} = \frac{[C_1 C_3 + (C_1 + C_2 + C_3)C_{hc}]V'_{mod} + (C_1 + C_2)C_3 V'_{fc} + C_1 C_3 V'_n}{(C_1 + C_2)C_3 + (C_1 + C_2 + C_3)(C_{hc} + C_p + C_t)} C_t \quad (5)$$

$$\Delta i_6 = i_6 - i_{6b} = \frac{[C_1 C_3 + (C_1 + C_2 + C_3)C_{hc}]V'_{mod} + (C_1 + C_2)C_3 V'_{fc} + C_1 C_3 V'_n}{(C_1 + C_2)C_3 + (C_1 + C_2 + C_3)(C_{hc} + C_p + C_t)} C_p \quad (6)$$

Equations 5 and 6 illustrate that the changes in the currents $i_5$ and $i_6$ (or charge) are greatly dependent on LGM and noise.

At block 520, the determination module in the processing system normalizes a change in capacitance (e.g., the delta currents or delta signals shown in Equation 5 and 6) corresponding to one of the sensor electrodes using a combination of the changes in capacitance corresponding to the other sensor electrodes to remove or mitigate the effects of LGM and noise. In one embodiment, this combination is a summation of all the delta signals for all the sensor electrodes sensed during block 505. Put differently, the determination module sums the delta signals for all the capacitive sensing pixels to generate a normalization value and then divides each of the individual delta signals by the normalization value. The effect of normalizing the output signal for pixel 205A (i.e., current $i_5$) is shown in Equation 7.

$$\frac{\Delta i_5}{\Delta i_5 + \Delta i_6} = \frac{C_t}{C_p + C_t} \quad (7)$$

Specifically, Equation 7 illustrates normalizing the delta signal for pixel 205A using the sum of all the measured delta signals of the pixels 205. The result is that the effects of LGM and noise have been removed from the delta signal of pixel 205A. The only dependence that remains in Equation 7 is a result of the capacitive coupling between the input object 140 and the sensor electrodes in the pixels 205. As an input object 140 approaches the sensing region comprising the pixels 205, the denominator of Equation 7 grows much faster than the numerator, resulting in a near linear relationship between the ratio of the input object to the sensor-region distance. Although the signal drops when the capacitance $C_p$ becomes large, the processing system can compensate by changing the threshold of detection as a function of $\Delta i_6$ or multiply the normalized signal by the total number of capacitive sensing pixels measuring non-zero output currents 410.

The determination module can use the normalization value to normalize each of the delta signals corresponding to the sensor electrodes sensed during block 505. That is, the determination module can generate a normalized delta signal for each of the capacitive sensing pixels 205. Although the determination module (e.g., hardware or firmware) in the processing system can perform block 520, in other embodiments, this normalization may be performed by a central processor in the input device, or by software.

At block 525, the determination module detects a location of the input object using the normalized change in capacitance (i.e., the normalized delta signal). In one embodiment, the determination module compares the normalized delta signals to one or more thresholds. Based on the change of the capacitance relative to the baseline measurement, the determination module can determine whether the input object is located at a portion of the sensing region that includes the capacitive sensing pixel. By repeating this process with each of the normalized delta signals for the capacitive sensing pixels, the determination module can determine where the input object is interacting with the sensing region—i.e., the location where the input object is contacting or hovering over the sensing region. Although this function is described as occurring in the determination module in the processing system, in other embodiments, block 525 may be performed by a central processor or by software.

Figure 6A:
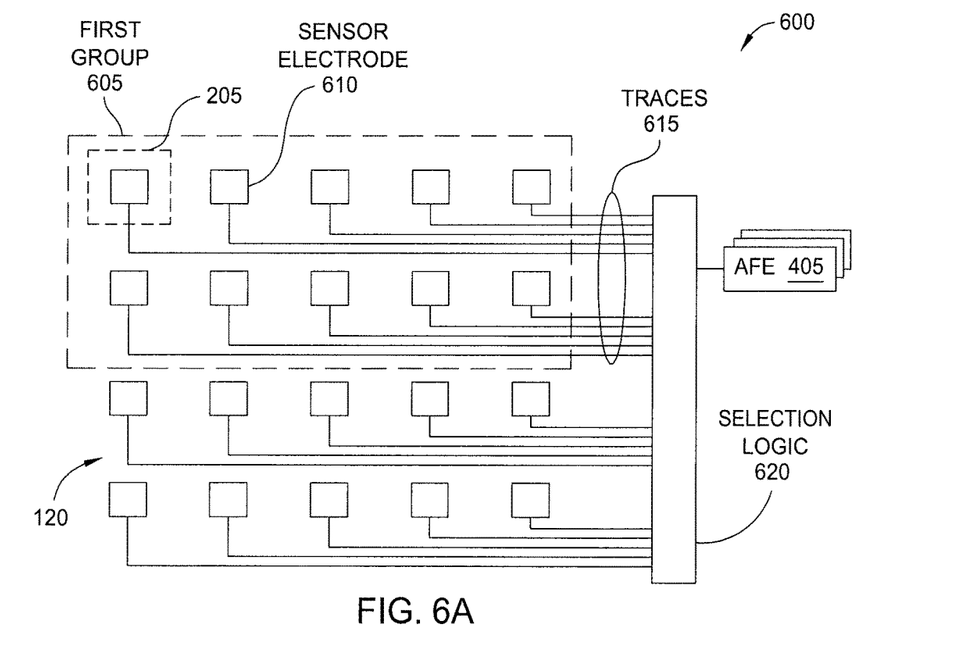
FIGS. 6A and 6B illustrate normalizing capacitive sensing measurements using different groups of sensor electrodes in accordance with an embodiment described herein.
Figure 6B:
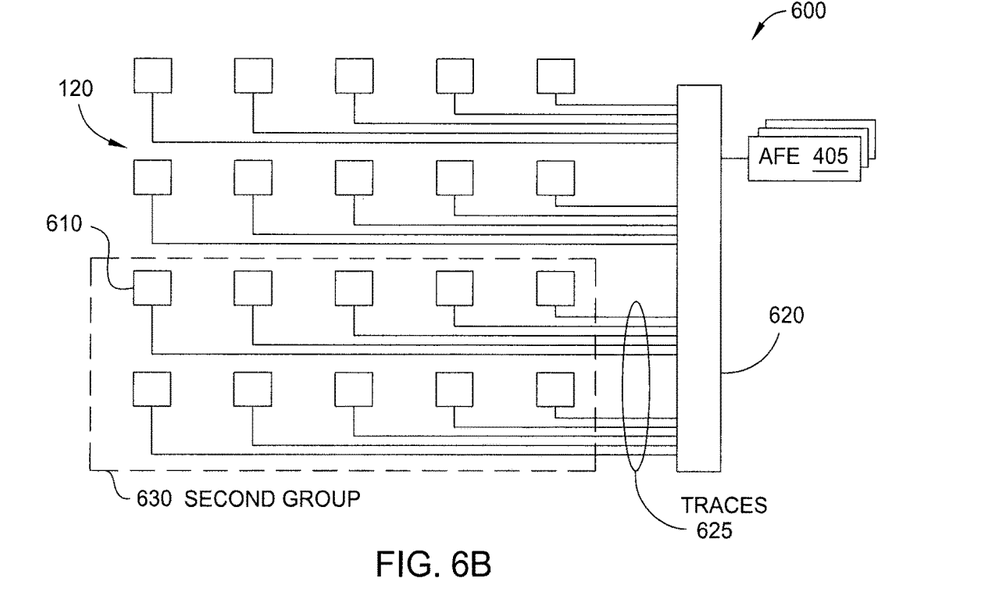

FIGS. 6A and 6B illustrate normalizing capacitive sensing measurements using different groups of sensor electrodes in accordance with an embodiment described herein. An input device may not include as many AFEs 140 as capacitive sensing pixels 205. As such, the input device cannot generate output signals from all the sensor electrodes 610 in the sensing region 120 simultaneously. The system 600 illustrates an input device which includes twenty sensor electrodes 610 but only ten AFEs 405. As such, when driving the capacitive sensing signal on the sensor electrodes 610, the AFEs 405 can generate outputs signals for only ten of the sensor electrodes 610.

In FIG. 6A, the first two rows of the sensor electrodes 610 form a first group 605. Each of the sensor electrodes 610 are coupled to selection logic 620 via traces 615. Using control signals, the selection logic 620 selectively couples the traces 615, and thereby the sensor electrodes 610, to the AFEs 405. Thus, in the time period illustrated in FIG. 6A, only the sensor electrodes 610 in the first group 605 are electrically coupled to the AFEs 405 while the remaining electrodes 610 (i.e., the lower half of the electrodes 610 in the sensing region 120) are not. As described above, method 500 can be used to drive the capacitive sensing signals onto the first group 605 of sensor electrodes 610 and generate output signals using the AFEs 405.

Using the delta signals generated from the output signals, the determination module in the processing system 110 (not shown) can sum the delta signals from the first group 605 to generate a normalization value. The determination module can then normalize the delta signal corresponding to each one of the sensor electrodes 610 and AFEs 405 to output first normalized delta signals. In this example, the determination module generates ten normalized delta signals by dividing the individual delta signals generated by the AFEs 405 by the first normalization value. These normalized delta signals can then be evaluated to detect a location of an input object in the upper half of the sensing region 120.

FIG. 6B is the same system 600 as that shown in FIG. 6A but at a different time period where the AFEs 405 generate output signals corresponding to the sensor electrode 610 in a second group 630. Put differently, the input device drives capacitive sensing signals on the ten sensor electrodes 610 in the second group 630 on the lower half of the sensing region 120. The sensor electrodes 610 are coupled to the selection logic 620 via traces 625. Using control signals, the selection logic 620 electrically couples the sensor electrodes 610 in the second group 630 to the AFEs 405.

Using delta signals generated from the output signals, the determination module sums the delta signals from the second group 630 of electrodes 610 to generate a second normalization value. The determination module can then normalize the individual delta signal corresponding to each one of the sensor electrodes 610 in the second group 630 to generate normalized delta signals. In this example, the determination module generates ten normalized output signals by dividing the individual delta signals generated by the AFEs 405 by the second normalization value. These normalized delta signals can be evaluated to detect a location of an input object in the lower half of the sensing region 120.

In this manner, the processing system 110 can evaluate individual groups of sensor electrodes 610 by generating a normalization value for each group of electrodes. Put differently, the processing system 110 generates a respective normalization value for each group of electrodes which is used to normalize the individual delta signals corresponding the sensor electrodes 610 in that group. As such, the processing system 110 does not need the same number of AFEs 405 as the number of pixels 205 and sensor electrodes 610 which can reduce cost and space in the input device. Instead, the processing system 110 can use multiple different sensing periods (one for each group) to generate normalized delta signals for all the capacitive sensing pixels 205 in the sensing region 120. Moreover, in one embodiment, the sensing periods may be interleaved with display updates. For example, the processing system 110 may generate normalized delta signals for the first group 605 of sensor electrodes 610 during a vertical or horizontal blanking period in a display frame. The processing system 110 may then update one or more rows of display pixels in a display before generating normalized delta signals for the second group 630 of the sensor electrode 610 during another blanking period in the display frame.

In one embodiment, the normalization value may be derived from delta signals that are not generated in response to driving simultaneous capacitive sensing signals. For example, the input device may drive the capacitive sensing signals onto the first group 605 of sensing electrodes 610 during a first time period and store the resulting delta signals. During a second time period, the input device drives the capacitive sensing signals onto the second group 630 of sensing electrodes 610 and measures the resulting delta signals. The input device may then sum all of the delta signals generated during the first and second time periods to generate the normalization value. The input device can divide (i.e., normalize) each of the individual delta signals measured during the first and second time periods to generate twenty normalized delta signals which can be used to detect an input object as described above. LGM changes slowly, and thus, the effects of LGM on the delta signals measured during the first and second time periods will be substantially the same (assuming the two time periods occur within, e.g., less than a second of each other). Thus the effect of LGM on the delta signals is removed by normalizing the delta signals.

However, many noise sources have short duration (e.g., short spikes) or change rapidly over time. Thus, combining the delta signals measured during the first and second time period to generate a global normalization value may mean normalizing the delta signals does not remove or mitigate the effect of the noise sources on the delta signals. That is, a noise source may affect the delta signals measured during the first time period but not the delta signals measured during the second time period. However, one advantage of using a global normalization value is that the input device does not have discontinuities that result at the boundaries between the first and second groups 605, 630 from using normalization values derived using only the delta signals from the sensor electrodes 610 in each group. But when using separate normalization values for each group of pixels (e.g., the first and second groups 605, 630), the discontinuity at the boundaries only occurs if the detection resolution of each pixels is not small enough. If there is sufficient resolution, then separate normalization values will not produce any discontinuities at the boundaries between the groups.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. An input device, comprising:
a plurality of sensor electrodes arranged in rows and columns in a sensing region of the input device, wherein each row and column comprises at least three sensor electrodes; and
a processing system coupled to the plurality of sensor electrodes, the processing system configured to:
drive a first plurality of capacitive sensing signals in parallel onto a first group of the plurality of sensor electrodes;
generate a first plurality of capacitive measurements corresponding to the first group of the plurality of sensor electrodes in response to driving the first plurality of capacitive sensing signals;
normalize a first capacitive measurement corresponding to one of the plurality of sensor electrodes in the first group using a combination of the first plurality of capacitive measurements; and
determine a location of an input object at least partially based on at least one of:
a comparison of the normalized first capacitive measurement and a detection threshold, wherein the normalized first capacitive measurement is adjusted at least partially based on a number of non-zero capacitive measurements in the first plurality of capacitive measurements generated in response to driving the first plurality of capacitive sensing signals; and
a comparison of the normalized first capacitive measurement and the detection threshold, wherein the detection threshold is adjusted at least partially based on at least a portion of the first plurality of capacitive measurements generated in response to driving the first plurality of capacitive sensing signals.

2. The input device of claim 1, wherein the combination of the first plurality of capacitive measurements is a summation of all of the first plurality of capacitive measurements corresponding to the first group of the plurality of sensor electrodes.

3. The input device of claim 1, wherein the processing system is configured to:
normalize a second capacitive measurement corresponding to a second one of the plurality of sensor electrodes in the first group using the combination of the first plurality of capacitive measurements; and
determine the location of the input object based on the normalized second capacitive measurement.

4. The input device of claim 3, wherein determining the location of the input object based on the first and second capacitive measurements comprises:
detecting a change of capacitance based on the normalized first and second capacitive measurements.

5. The input device of claim 1, wherein the processing system is configured to perform absolute capacitive sensing to generate the first plurality of capacitive measurements for the first group of the plurality of sensor electrodes, and wherein the first plurality of capacitive measurements comprise delta signals derived from comparing output signals generated by analog front ends to baseline measurements.

6. The input device of claim 1, wherein the plurality of sensor electrodes are arranged in a rectangular array on a common plane.

7. The input device of claim 1, wherein the processing system is configured to:
drive a second plurality of capacitive sensing signals in parallel onto a second group of the plurality of sensor electrodes, wherein the second group of the plurality of sensor electrodes are in the sensing region;
generate a second plurality of capacitive measurements corresponding to the second group of the plurality of sensor electrodes caused by driving the second plurality of capacitive sensing signals;
normalize a second capacitive measurement corresponding to one of the plurality of sensor electrodes in the second group using a combination of the second plurality of capacitive measurements; and
determine the location of the input object based on the normalized second capacitive measurement.

8. A processing system, comprising:
a sensor module configured to drive a first plurality of capacitive sensing signals in parallel onto a first group of a plurality of sensor electrodes, the plurality of sensor electrodes are arranged in rows and columns, each row and column comprises at least three sensor electrodes;
a determination module configured to:
generate a first plurality of capacitive measurements corresponding to the first group of the plurality of sensor electrodes in response to driving the first plurality of capacitive sensing signals;
normalize a first capacitive measurement corresponding to one of the plurality of sensor electrodes in the first group using a combination of the first plurality of capacitive measurements; and
determine a location of an input object at least partially based on at least one of:
a comparison of the normalized first capacitive measurement and a detection threshold, wherein the normalized first capacitive measurement is adjusted at least partially based on a number of non-zero capacitive measurements in the first plurality of capacitive measurements generated in response to driving the first plurality of capacitive sensing signals; and
a comparison of the normalized first capacitive measurement and the detection threshold, wherein the detection threshold is adjusted at least partially based on at least a portion of the first plurality of capacitive measurements generated in response to driving the first plurality of capacitive sensing signals.

9. The processing system of claim 8, wherein the combination of the first plurality of capacitive measurements is a summation of all of the first plurality of capacitive measurements corresponding to the first group of the plurality of sensor electrodes.

10. The processing system of claim 8, wherein the determination module is configured to:
normalize a second capacitive measurement corresponding to a second one of the plurality of sensor electrodes in the first group using the combination of the first plurality of capacitive measurements; and
determine the location of the input object based on the normalized second capacitive measurement.

11. The processing system of claim 10, wherein determining the location of the input object based on the first and second capacitive measurements comprises:

detecting a change of capacitance based on the normalized first and second capacitive measurements.

12. The processing system of claim 8, wherein the determination module is configured to perform absolute capacitive sensing to generate the first plurality of capacitive measurements for the first group of the plurality of sensor electrodes.

13. The processing system of claim 8, wherein determining the location of the input object comprises:
determining the location of the input object within a sensing region established by the plurality of sensor electrodes.

14. The processing system of claim 8, wherein the sensor module is configured to drive a second plurality of capacitive sensing signals in parallel onto a second group of the plurality of sensor electrodes, wherein the second group of the plurality of sensor electrodes are in a sensing region along with the first group of the plurality of sensor electrodes;
wherein the determination module is configured to:
generate a second plurality of capacitive measurements corresponding to the second group of the plurality of sensor electrodes caused by driving the second plurality of capacitive sensing signals;
normalize a second capacitive measurement corresponding to one of the plurality of sensor electrodes in the second group using a combination of the second plurality of capacitive measurements; and
determine the location of the input object based on the normalized second capacitive measurement.

15. A method, comprising:
driving a first plurality of capacitive sensing signals in parallel onto a first group of a plurality of sensor electrodes, wherein the plurality of sensor electrodes are in a sensing region of an input device and are arranged in rows and columns, each row and column having at least three sensor electrodes;
generating a first plurality of capacitive measurements corresponding to the first group of the plurality of sensor electrodes in response to driving the first plurality of capacitive sensing signals;
normalizing a first capacitive measurement corresponding to one of the plurality of sensor electrodes in the first group using a combination of the first plurality of capacitive measurements; and
determining a location of an input object at least partially based on at least one of:
a comparison of the normalized first capacitive measurement and a detection threshold, wherein the normalized first capacitive measurement is adjusted at least partially based on a number of non-zero capacitive measurements in the first plurality of capacitive measurements generated in response to driving the first plurality of capacitive sensing signals; and
a comparison of the normalized first capacitive measurement and the detection threshold, wherein the detection threshold s adjusted at least partially based on at least a portion of the first plurality of capacitive measurements generated in response to driving the first plurality of capacitive sensing signals.

16. The method of claim 15, wherein the combination of the first plurality of capacitive measurements is a summation of all of the first plurality of capacitive measurements corresponding to the first group of the plurality of sensor electrodes.

17. The method of claim 15, further comprising:
normalizing a second capacitive measurement corresponding to a second one of the plurality of sensor electrodes in the first group using the combination of the first plurality of capacitive measurements; and
detecting the location of the input object based on the normalized second capacitive measurement.

18. The method of claim 15, wherein generating the first plurality of capacitive measurements further comprises:
performing absolute capacitive sensing to generate the first plurality of capacitive measurements for the first group of the plurality of sensor electrodes.

19. The method of claim 15, wherein the plurality of sensor electrodes are arranged in a rectangular array on a common plane.

20. The method of claim 15, further comprising:
driving a second plurality of capacitive sensing signals in parallel onto a second group of the plurality of sensor electrodes, wherein the second group of the plurality of sensor electrodes are in the sensing region;
generating a second plurality of capacitive measurements corresponding to the second group of the plurality of sensor electrodes caused by driving the second plurality of capacitive sensing signals;
normalizing a second capacitive measurement corresponding to one of the plurality of sensor electrodes in the second group using a combination of the second plurality of capacitive measurements; and
detecting the location of the input object based on the normalized second capacitive measurement.

* * * * *